United States Patent
Wang et al.

(10) Patent No.: US 10,848,007 B2
(45) Date of Patent: Nov. 24, 2020

(54) BATTERY AND BATTERY SET CAPABLE OF EXTRACTING ENERGY WIRELESSLY

(71) Applicant: TLHM CO., LTD., Chia-Yi (TW)

(72) Inventors: Nai-Chen Wang, Tainan (TW); Yong-Keong Tay, Chiayi (TW); Chia-Chen Chang, Taipei (TW)

(73) Assignee: TLHM CO., LTD., Chia-Yi (TW)

( * ) Notice: Subject to any disclaimer, the term of this patent is extended or adjusted under 35 U.S.C. 154(b) by 189 days.

(21) Appl. No.: 16/231,853

(22) Filed: Dec. 24, 2018

(65) Prior Publication Data
US 2020/0021140 A1  Jan. 16, 2020

(30) Foreign Application Priority Data
Jul. 12, 2018 (TW) .............................. 107124037 A

(51) Int. Cl.
*H02J 7/00* (2006.01)
*H02J 50/20* (2016.01)
*H04B 5/00* (2006.01)
*H02J 7/34* (2006.01)

(52) U.S. Cl.
CPC ............... *H02J 50/20* (2016.02); *H02J 7/00* (2013.01); *H02J 7/345* (2013.01); *H04B 5/0037* (2013.01)

(58) Field of Classification Search
CPC .. H02J 7/025; H02J 50/10; H02J 50/20; H02J 50/40; H02J 7/04; H02J 7/0042; H02J 7/0013; H02J 7/007; H04M 2001/0204
See application file for complete search history.

(56) References Cited

U.S. PATENT DOCUMENTS

| | | | | |
|---|---|---|---|---|
| 7,456,606 B1* | 11/2008 | Legg | ........................ | H02J 50/12 320/108 |
| 2009/0058361 A1* | 3/2009 | John | ........................ | H02J 50/80 320/128 |
| 2011/0086256 A1* | 4/2011 | Julstrom | .................. | H02J 50/12 429/121 |
| 2013/0175982 A1* | 7/2013 | Teggatz | ............ | H01M 10/4257 320/108 |
| 2016/0301240 A1* | 10/2016 | Zeine | ...................... | H02J 50/10 |

FOREIGN PATENT DOCUMENTS

WO   WO-2019186542 A1 * 10/2019 ............ H02J 7/0042

* cited by examiner

*Primary Examiner* — Daniel J Cavallari
(74) *Attorney, Agent, or Firm* — Chun-Ming Shih; HDLS IPR Services

(57) ABSTRACT

A battery includes a housing, and a wireless energy extracting device installed in the housing. The wireless energy extracting device includes: an RF generator module for wirelessly receiving an RF charging signal to generate electrical energy; a capacitor module; and an energy management module coupled to the RF generator module and the capacitor module, adapted to be coupled further to an energy consuming device, and performing electrical energy transfer from at least the RF generator module to at least the energy consuming device. Therefore, the battery has relatively low electrical energy loss and thus relatively high energy usage efficiency, and can be charged even if the battery is installed in the energy consuming device.

19 Claims, 7 Drawing Sheets

BATTERY AND BATTERY SET CAPABLE OF EXTRACTING ENERGY WIRELESSLY

CROSS-REFERENCE TO RELATED APPLICATION

This application claims priority of Taiwanese Patent Application No. 107124037, filed on Jul. 12, 2018.

FIELD

The disclosure relates to wireless energy transfer, and more particularly to a battery and a battery set that are capable of extracting energy wirelessly.

BACKGROUND

Wireless charging technology is widely used in devices such as mobile devices, electric cars, home appliances, etc. In radio frequency (RF) charging, a transmitter wirelessly transmits a radio wave to a receiver for generating electrical energy. The RF charging has several traits that contribute to its popularity, gradually becoming the mainstream wireless charging technology: multiple receivers can receive the radio wave simultaneously, and a distance between each receiver and the transmitter can be greater than 4.5 meters.

First, a conventional receiver stores the electrical energy generated from the radio wave in an energy storage element (e.g., a lithium battery), and then outputs the electrical energy released from the energy storage element to an energy consuming device. Since the conventional receiver always performs electrical energy transfer twice on the electrical energy generated from the radio wave, it has relatively high electrical energy loss and thus relatively low energy usage efficiency.

Moreover, batteries of size A, size AA, size AAA, size AAAA, etc. are widely used. A conventional rechargeable battery of any of these sizes must be moved from an electronic device, in which the rechargeable battery is installed, to a charging stand so as to be charged. This is not convenient.

SUMMARY

Therefore, an object of the disclosure is to provide a battery that is capable of extracting energy wirelessly and that can alleviate at least one drawback of the prior art, and a battery set using the same.

According to an aspect of the disclosure, the battery includes a housing, and a wireless energy extracting device installed in the housing. The wireless energy extracting device includes a radio frequency (RF) generator module, a capacitor module and an energy management module. The RF generator module is for wirelessly receiving an RF charging signal to generate electrical energy. The capacitor module includes a capacitor electrode unit that is exposed from the housing, and that is adapted to be coupled to a capacitor electrode unit of an additional one of the battery such that the capacitor module is coupled to a capacitor module of the additional one of the battery in parallel. The energy management module is coupled to the RF generator module and the capacitor module, includes an output electrode unit that is exposed from the housing and that is adapted to be coupled to an energy consuming device, and performs electrical energy transfer among the RF generator module, the capacitor module and the energy consuming device. When the energy management module determines that output power of the RF generator module is greater than or equal to power required by the energy consuming device, the energy management module operates in a first state where electrical energy transfer from the RF generator module to at least the energy consuming device is performed. When the energy management module determines that the output power of the RF generator module is smaller than the power required by the energy consuming device, the energy management module operates in a second state where electrical energy transfer from the RF generator module and the capacitor module to the energy consuming device is performed.

According to another aspect of the disclosure, the battery set includes a main battery and a number (P) of auxiliary batteries, where P≥1. The main battery includes a first housing, and a first wireless energy extracting device installed in the first housing. The first wireless energy extracting device includes a first RF generator module, a first capacitor module and a first energy management module. The first RF generator module is for wirelessly receiving an RF charging signal to generate electrical energy. The first capacitor module includes a first capacitor electrode unit exposed from the first housing. The first energy management module is coupled to the first RF generator module and the first capacitor module, includes a first output electrode unit that is exposed from the first housing and that is adapted to be coupled to an energy consuming device, and performs electrical energy transfer among the first RF generator module, the first capacitor module and the energy consuming device. When the first energy management module determines that output power of the first RF generator module is greater than or equal to power required by the energy consuming device, the first energy management module operates in a first state where electrical energy transfer from the first RF generator module to at least the energy consuming device is performed. When the first energy management module determines that the output power of the first RF generator module is smaller than the power required by the energy consuming device, the first energy management module operates in a second state where electrical energy transfer from the first RF generator module and the first capacitor module to the energy consuming device is performed. Each of the auxiliary batteries includes a second housing, and a second wireless energy extracting device installed in the second housing. The second wireless energy extracting device includes a second RF generator module, a second capacitor module and a second energy management module. The second RF generator module is for wirelessly receiving the RF charging signal to generate electrical energy. The second capacitor module includes a second capacitor electrode unit that is exposed from the second housing, and that is coupled to the first capacitor electrode unit such that the second capacitor module is coupled to the first capacitor module in parallel. The second energy management module is coupled to the second RF generator module and the second capacitor module, and performs electrical energy transfer from the second RF generator module to the second capacitor module.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
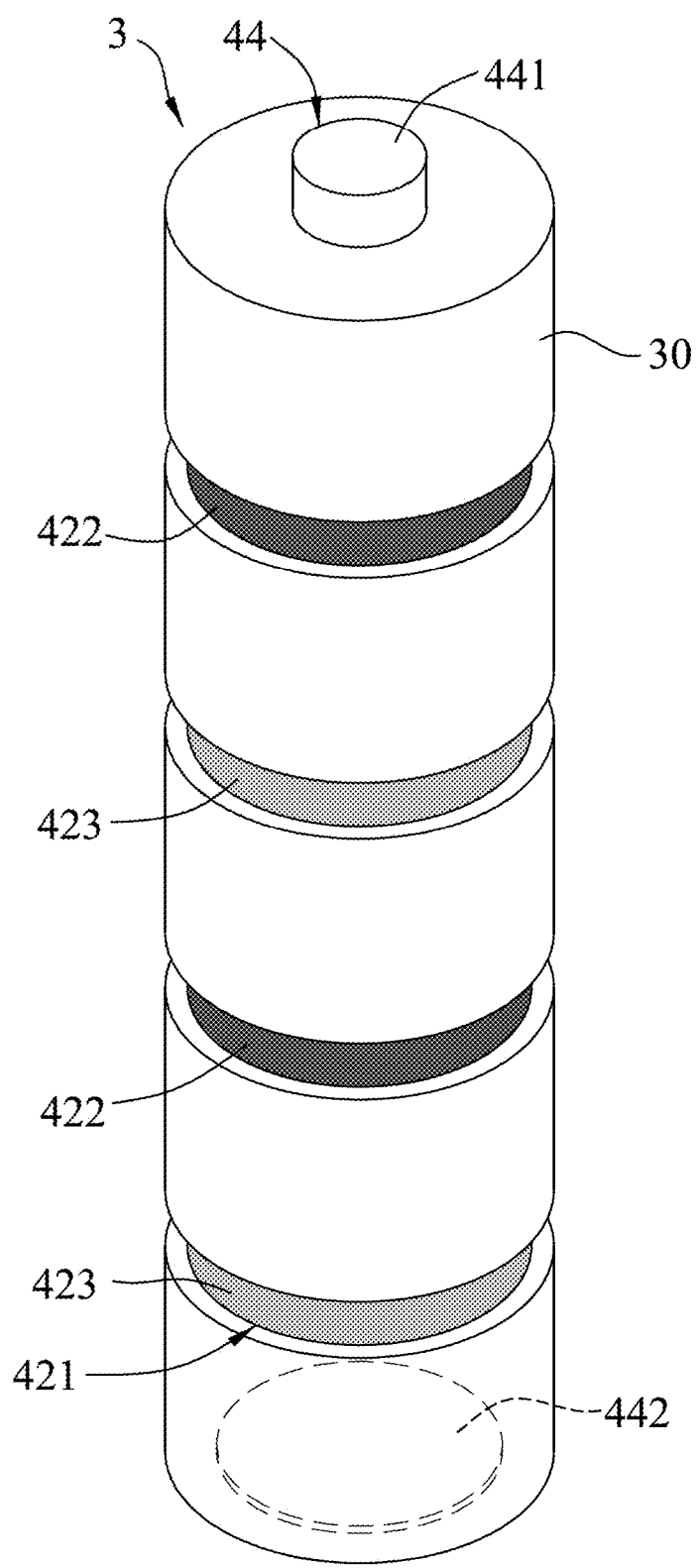
FIG. 1 is a perspective view of an embodiment of a battery according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
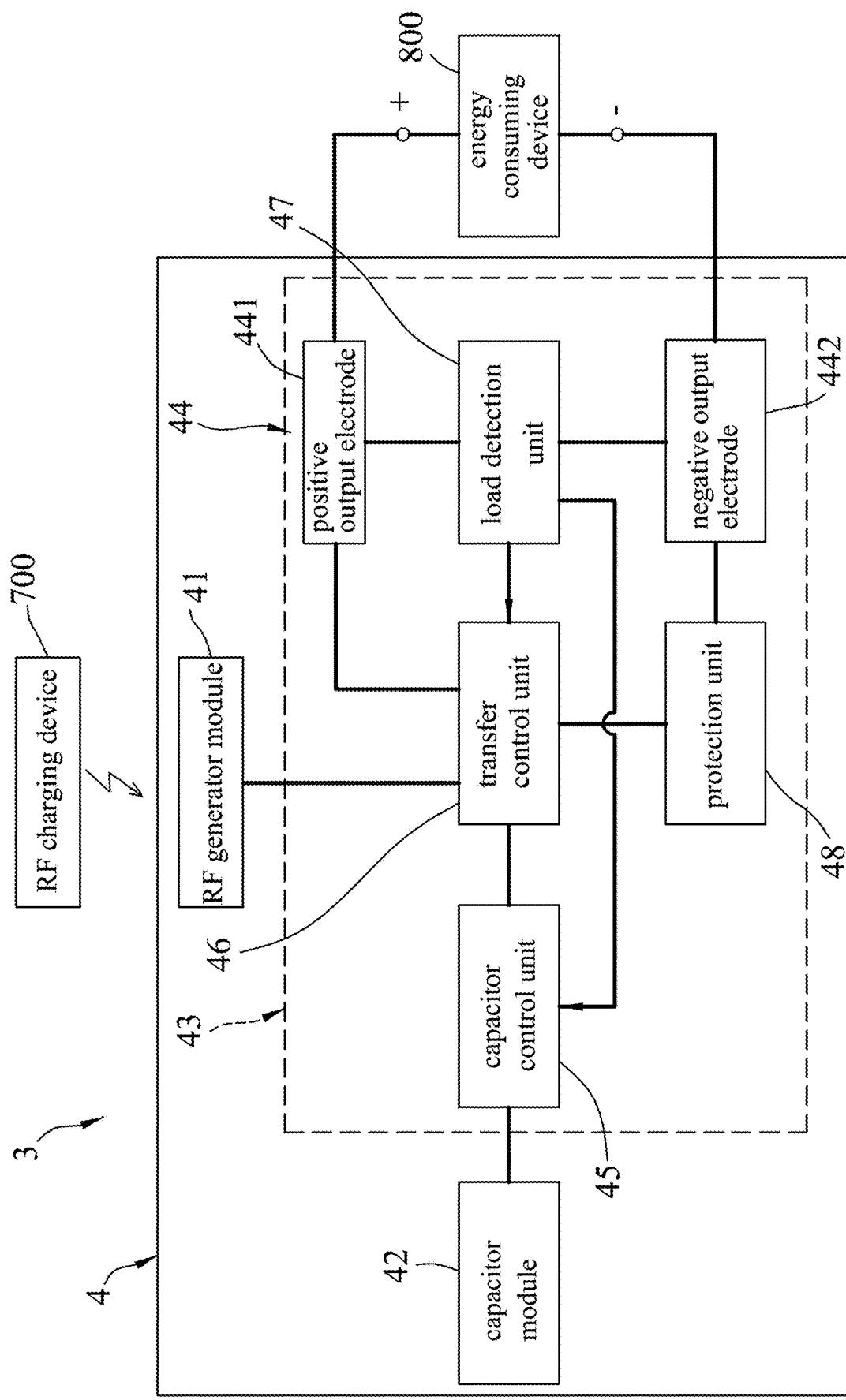
FIG. 2 is a block diagram illustrating the embodiment of the battery according to the disclosure.

Referring to FIGS. 1 and 2, an embodiment of a battery 3 according to the disclosure is capable of extracting energy wirelessly, and is operatively associated with a radio frequency (RF) charging device 700 and an energy consuming device 800. The energy consuming device 800 is, for example, an electronic lock, a remote controller or a game machine. The battery 3 of this embodiment includes a housing 30, and a wireless energy extracting device 4 installed in the housing 30.

In this embodiment, the housing 30 is rod shaped, and is of one of size A, size AA, size AAA, size AAAA, etc. Therefore, the battery 3 of this embodiment can be used to replace the conventional rechargeable battery of said one of size A, size AA, size AAA, size AAAA, etc.

The wireless energy extracting device 4 includes an RF generator module 41, a capacitor module 42 and an energy management module 43.

The RF generator module 41 is for wirelessly receiving an RF charging signal from the RF charging device 700 to generate electrical energy.

The capacitor module 42 (e.g., a supercapacitor) includes a capacitor electrode unit 421. In this embodiment, the capacitor electrode unit 421 includes a number (M) of positive capacitor electrodes 422 and a number (N) of negative capacitor electrodes 423, where M≥1 and N≥1. For illustration purposes, M=2 and N=2 in this embodiment. The positive capacitor electrodes 422 are coupled to each other. The negative capacitor electrodes 423 are coupled to each other. The positive and negative capacitor electrodes 422, 423 are arranged interlacedly and at intervals along an axis of the housing 30. Each of the positive and negative capacitor electrodes 422, 423 is ring shaped, and has an outer surface exposed from a peripheral surface of the housing 30. The positive capacitor electrodes 422 of the battery 3 can be coupled to the positive capacitor electrodes of an additional one of the battery, and the negative capacitor electrodes 423 of the battery 3 can be coupled to the negative capacitor electrodes of the additional one of the battery, so the capacitor module 42 of the battery 3 is coupled to the capacitor module of the additional one of the battery in parallel.

The energy management module 43 is coupled to the RF generator module 41 and the capacitor module 42, is adapted to be coupled further to the energy consuming device 800, and performs electrical energy transfer among the RF generator module 41, the capacitor module 42 and the energy consuming device 800.

In this embodiment, the energy management module 43 includes an output electrode unit 44, a capacitor control unit 45, a transfer control unit 46, a load detection unit 47 and a protection unit 48. The output electrode unit 44 includes a positive output electrode 441 and a negative output electrode 442 that are respectively exposed from two opposite end surfaces of the housing 30, and that are adapted to be respectively coupled to a positive terminal and a negative terminal of the energy consuming device 800. The negative output electrode 442 is coupled further to the negative capacitor electrodes 423 and ground. The capacitor control unit 45 is coupled to the capacitor module 42. The transfer control unit 46 is coupled to the RF generator module 41, the positive output electrode 441 and the capacitor control unit 45. The load detection unit 47 is coupled to the positive and negative output electrodes 441, 442, the capacitor control unit 45 and the transfer control unit 46. The protection unit 48 is coupled between the negative output electrode 442 and the transfer control unit 46.

The load detection unit 47 detects whether there is a load to receive electrical energy. The load detection unit 47 detects that there is a load to receive electrical energy when the positive and negative output electrodes 441, 442 are coupled to a load (e.g., the energy consuming device 800) and are not short circuited to each other.

The protection unit 48 allows current flow from the negative output electrode 442 to the transfer control unit 46 therethrough, and prevents current flow from the transfer control unit 46 to the negative output electrode 442 therethrough. Therefore, when the negative output electrode 442 of the battery 3 is coupled to the negative output electrode of an additional one of the battery, the protection unit 48 of the battery 3 can prevent the transfer control unit 46 of the battery 3 from being damaged by the additional one of the battery. In this embodiment, the protection unit 48 includes a diode; and the diode has an anode that is coupled to the negative electrode 442, and a cathode that is coupled to the transfer control unit 46. In another embodiment, the diode may be replaced by a transistor (e.g., a field effect transistor). However, the disclosure is not limited thereto.

The capacitor control unit 45 detects a residual electric quantity of the capacitor module 42, and is operable to cause the capacitor module 42 to perform one of storing electrical energy and releasing electrical energy stored therein.

The transfer control unit 46 detects output power of the RF generator module 41, estimates power required by the energy consuming device 800, performs electrical energy transfer among the RF generator module 41, the capacitor control unit 45 and the energy consuming device 800, and controls operation of the capacitor control unit 45.

In particular, The transfer control unit 46 cooperates with the capacitor control unit 45 to perform the electrical energy transfer among the RF generator module 41, the capacitor module 42 and the energy consuming device 800 based on a result of the detection of the load detection unit 47, the detected output power of the RF generator module 41, the estimated power required by the energy consuming device 800 and the detected residual electric quantity of the capacitor module 42.

When the result of the detection of the load detection unit 47 indicates that there is no load to receive electrical energy, the energy management module 43 enters an inactive mode where electrical energy transfer from the RF generator module 41 to the capacitor module 42 is selectively performed. In the inactive mode, when the transfer control unit 46 determines that the detected residual electric quantity of the capacitor module 42 is smaller than a predetermined saturation threshold, the electrical energy transfer from the RF generator module 41 to the capacitor module 42 is performed. In detail, the transfer control unit 46 transfers the electrical energy generated by the RF generator module 41 to the capacitor control unit 45, and controls the capacitor control unit 45 to cause the capacitor module 42 to store the electrical energy generated by the RF generator module 41. In the inactive mode, when the transfer control unit 46 determines that the detected residual electric quantity of the capacitor module 42 is greater than or equal to the saturation threshold, the electrical energy transfer from the RF generator module 41 to the capacitor module 42 is not performed.

When the result of the detection of the load detection unit 47 indicates that there is a load to receive electrical energy, the energy management module 43 enters an active mode. In the active mode, the energy management module 43 selectively operates in one of a first state, a second state and a third state.

In the active mode, when the transfer control unit 46 determines that the detected output power of the RF generator module 41 is greater than or equal to the estimated power required by the energy consuming device 800, the energy management module 43 operates in the first state where electrical energy transfer from the RF generator module 41 to at least the energy consuming device 800 is performed.

In the first state, electrical energy transfer from the RF generator module 41 to the energy consuming device 800 and the capacitor module 42 is performed when the transfer control unit 46 determines that the detected output power of the RF generator module 41 is greater than the estimated power required by the energy consuming device 800 while the detected residual electric quantity of the capacitor module 42 is smaller than the saturation threshold. In detail, the transfer control unit 46 transfers a portion of the electrical energy generated by the RF generator module 41 to the energy consuming device 800, transfers the other portion of the electrical energy generated by the RF generator module 41 to the capacitor control unit 45, and controls the capacitor control unit 45 to cause the capacitor module 42 to store the other portion of the electrical energy generated by the RF generator module 41; and input power of the capacitor module 42 equals the output power of the RF generator module 41 minus the power required by the energy consuming device 800.

In the first state, electrical energy transfer from the RF generator module 41 to the energy consuming device 800 is performed when one of the following conditions is met: (a) the transfer control unit 46 determines that the detected output power of the RF generator module 41 is equal to the estimated power required by the energy consuming device 800; and (b) the transfer control unit 46 determines that the detected output power of the RF generator module 41 is greater than the estimated power required by the energy consuming device 800 while the detected residual electric quantity of the capacitor module 42 is greater than or equal to the saturation threshold. In detail, the transfer control unit 46 transfers at least a portion of the electrical energy generated by the RF generator module 41 to the energy consuming device 800.

In the active mode, when the transfer control unit 46 determines that the detected output power of the RF generator module 41 is smaller than the estimated power required by the energy consuming device 800 while the detected residual electric quantity of the capacitor module 42 is greater than or equal to a lower limit value, the energy management module 43 operates in the second state where electrical energy transfer from the RF generator module 41 and the capacitor module 42 to the energy consuming device 800 is performed. In detail, the transfer control unit 46 controls the capacitor control unit 45 to cause the capacitor module 42 to release the electrical energy stored therein, and transfers the electrical energy generated by the RF generator module 41 and the electrical energy released by the capacitor module 42 to the energy consuming device 800; and output power of the capacitor module 42 equals the power required by the energy consuming device 800 minus the output power of the RF generator module 41.

In the active mode, when the transfer control unit 46 determines that the detected output power of the RF generator module 41 is smaller than the estimated power required by the energy consuming device 800 while the detected residual electric quantity of the capacitor module 42 is smaller than the lower limit value, the energy management module 43 operates in a third state where electrical energy transfer from the RF generator module 41 to the capacitor module 42 is performed. In detail, the transfer control unit 46 transfers the electrical energy generated by the RF generator module 41 to the capacitor control unit 45, and controls the capacitor control unit 45 to cause the capacitor module 42 to store the electrical energy generated by the RF generator module 41.

In the active mode, the transfer control unit 46 further sets the lower limit value to be equal to one of a predetermined discharge threshold (which is smaller than the saturation threshold) and a cutoff threshold (which is smaller than the discharge threshold). At default setting, the lower limit value is equal to the discharge threshold, is set to be equal to the discharge threshold when the energy management module 43 operates in any of the first and third states, and is set to be equal to the cutoff threshold when the energy management module 43 operates in the second state. It should be noted that the cutoff threshold may be a predetermined constant, or may be variable according to a difference between the detected output power of the RF generator module 41 and the estimated power required by the energy consuming device 800.

As a result, in a scenario where the positive and negative output electrodes 441, 442 are not coupled to the energy consuming device 800 (or the positive and negative output electrodes 441, 442 are coupled to the energy consuming device 800 and are short circuited to each other), and where the residual electric quantity of the capacitor module 42 is initially smaller than the saturation threshold, the energy management module 43 enters the inactive mode, and the capacitor module 32 is charged until the residual electric quantity thereof is increased to the saturation threshold.

In addition, in a scenario where the positive and negative output electrodes 441, 442 are coupled to the energy consuming device 800 and are not short circuited to each other, where the output power of the RF generator module 41 is consecutively greater than the power required by the energy consuming device 800, and where the residual electric quantity of the capacitor module 42 is initially smaller than the saturation threshold, the energy management module 33 enters the active mode and operates in the first state, and the capacitor module 32 is charged until the residual electric quantity thereof is increased to the saturation threshold.

Moreover, in a scenario where the positive and negative output electrodes 441, 442 are coupled to the energy consuming device 800 and are not short circuited to each other, where the output power of the RF generator module 31 is consecutively smaller than the power required by the energy consuming device 800, and where the residual electric quantity of the capacitor module 32 is initially greater than or equal to the discharge threshold, the energy management module 3 enters the active mode and operates in one of the following states in a cyclic manner: the energy management module 3 operates in the second state and the capacitor module 32 is discharged until the residual electric quantity of the capacitor module 32 is decreased to the cutoff threshold; and the energy management module 3 operates in the third state and the capacitor module 32 is charged until the residual electric quantity of the capacitor module 32 is increased to the discharge threshold.

In this embodiment, in the first and second states, the transfer control unit 46 further regulates a voltage provided thereby to the energy consuming device 800, so as to stabilize the voltage at a predetermined target value (e.g., 1.5V, 3V, 6V or 12V). It should be noted that the target value, the saturation threshold, the discharge threshold and the cutoff threshold can be set through software and/or hardware after the battery 3 is manufactured and before the battery 3 is used.

In this embodiment, the lower limit value is set to be equal to one of the discharge threshold and the cutoff threshold. However, in another embodiment, the discharge threshold and the setting of the lower limit value may be omitted, and the lower limit value may be always equal to the cutoff threshold.

In view of the above, the battery 3 of this embodiment has the following advantages:

1. In the active mode, since the energy management module 43 can transfer at least a portion of the electrical energy generated by the RF generator module 41 directly to the energy consuming device 800, at most a portion of the electrical energy generated by the RF generator module 41 is transferred first to the capacitor module 42 and then to the energy consuming device 800. Therefore, the battery 3 has relatively low electrical energy loss and thus relatively high energy usage efficiency in the active mode.

2. Since the RF generator module 41 can wirelessly receives the RF charging signal to generate electrical energy, when the battery 3 is installed in the energy consuming device 800, there is no need to remove the battery 3 from the energy consuming device 800 before charging the battery 3.

Figure 3:
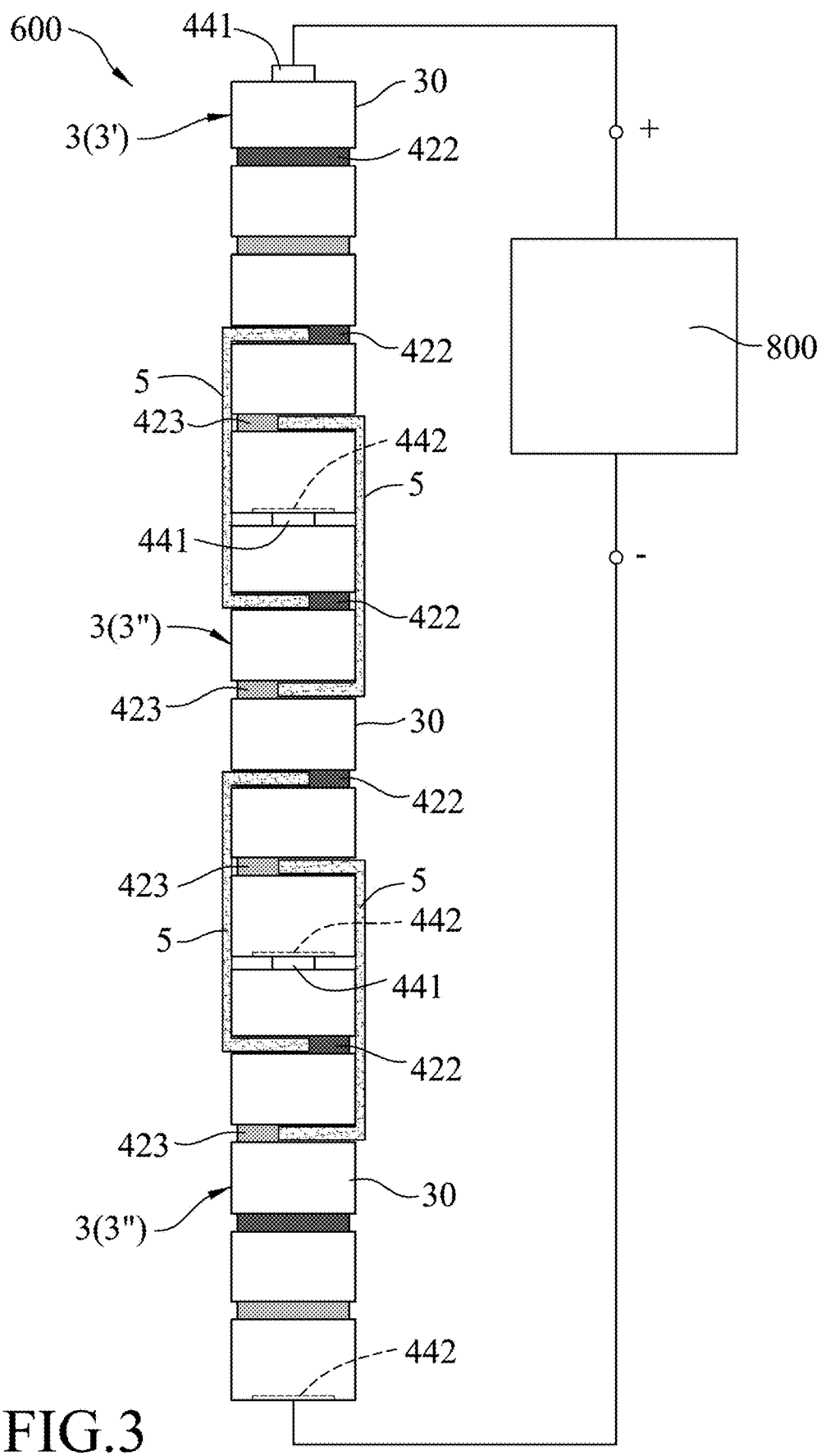
FIG. 3 is a side view of a first embodiment of a battery set according to the disclosure, which includes a plurality of the batteries that are each shown in FIG. 1 and that are arranged tandem.

Referring to FIGS. 2 and 3, a first embodiment of a battery set 600 according to the disclosure includes a number (P+1) of the aforesaid batteries 3 and a plurality of conductive elements 5, where P≥1. One of the batteries 3 serves as a main battery 3', and each of remaining ones of the batteries 3 serve as an auxiliary battery 3". For illustration purposes, P=2 in this embodiment.

In this embodiment, the main and auxiliary batteries 3', 3" are arranged tandem. In other words, the main and auxiliary batteries 3', 3" are arranged along the axis of the housing 30 of the main battery 3'.

Through the conductive elements, the positive capacitor electrodes 422 of the main and auxiliary batteries 3', 3" are coupled to one another, and the negative capacitor electrodes 423 of the main and auxiliary batteries 3', 3" are coupled to one another, so the capacitor modules 42 of the main and auxiliary batteries 3', 3" are coupled in parallel.

The positive output electrode 441 of the main battery 3' is adapted to be coupled to the positive terminal of the energy consuming device 800. The positive output electrode 441 of a first one of the auxiliary batteries 3" is coupled to the negative output electrode 442 of the main battery 3'. The positive output electrode 441 of a $p^{th}$ one of the auxiliary batteries 3" is coupled to the negative output electrode 442 of a $(p-1)^{th}$ one of the auxiliary batteries 3", where $2 \leq p \leq P$ (i.e., p=2 in this embodiment). The negative output electrode 442 of a $P^{th}$ (i.e., second in this embodiment) one of the auxiliary batteries 3" is adapted to be coupled to the negative terminal of the energy consuming device 800. Since the negative output electrodes 442 of the main and auxiliary batteries 3', 3" are all grounded, the positive output electrodes 442 of the auxiliary batteries 3" and the negative terminal of the energy consuming device 800 are all grounded as well, and the negative output electrodes 442 of the main and auxiliary batteries 3', 3", the positive output electrodes 442 of the auxiliary batteries 3" and the negative terminal of the energy consuming device 800 are short circuited to one another.

In operation, the energy management module 43 of the main battery 3' enters the active mode and selectively operates in one of the first to third states, and the energy management module 43 of each of the auxiliary batteries 3" enters the inactive mode.

It should be noted that, since the capacitor modules 42 of the main and auxiliary batteries 3', 3" are coupled in parallel, these capacitor modules 42 are charged simultaneously and are discharged simultaneously, and the total number of the auxiliary batteries 3" (i.e., the number (P)) can be adjusted to change electrical energy storage capacity of the battery set 600 of this embodiment.

It should be noted that a cover (not shown) can be used to cover and secure the main and auxiliary batteries 3', 3", with the positive output electrode 441 of the main battery 3' and the negative output electrode 442 of the $P^{th}$ (i.e., second in this embodiment) one of the auxiliary batteries 3" exposed from the cover. The cover may be, for example, a soft film or a hard case.

It should be noted that, when P=1, the positive output electrode 441 of the auxiliary battery 3" is coupled to the negative output electrode 442 of the main battery 3', and the negative output electrode 442 of the auxiliary battery 3" is adapted to be coupled to the negative terminal of the energy consuming device.

Figure 4:
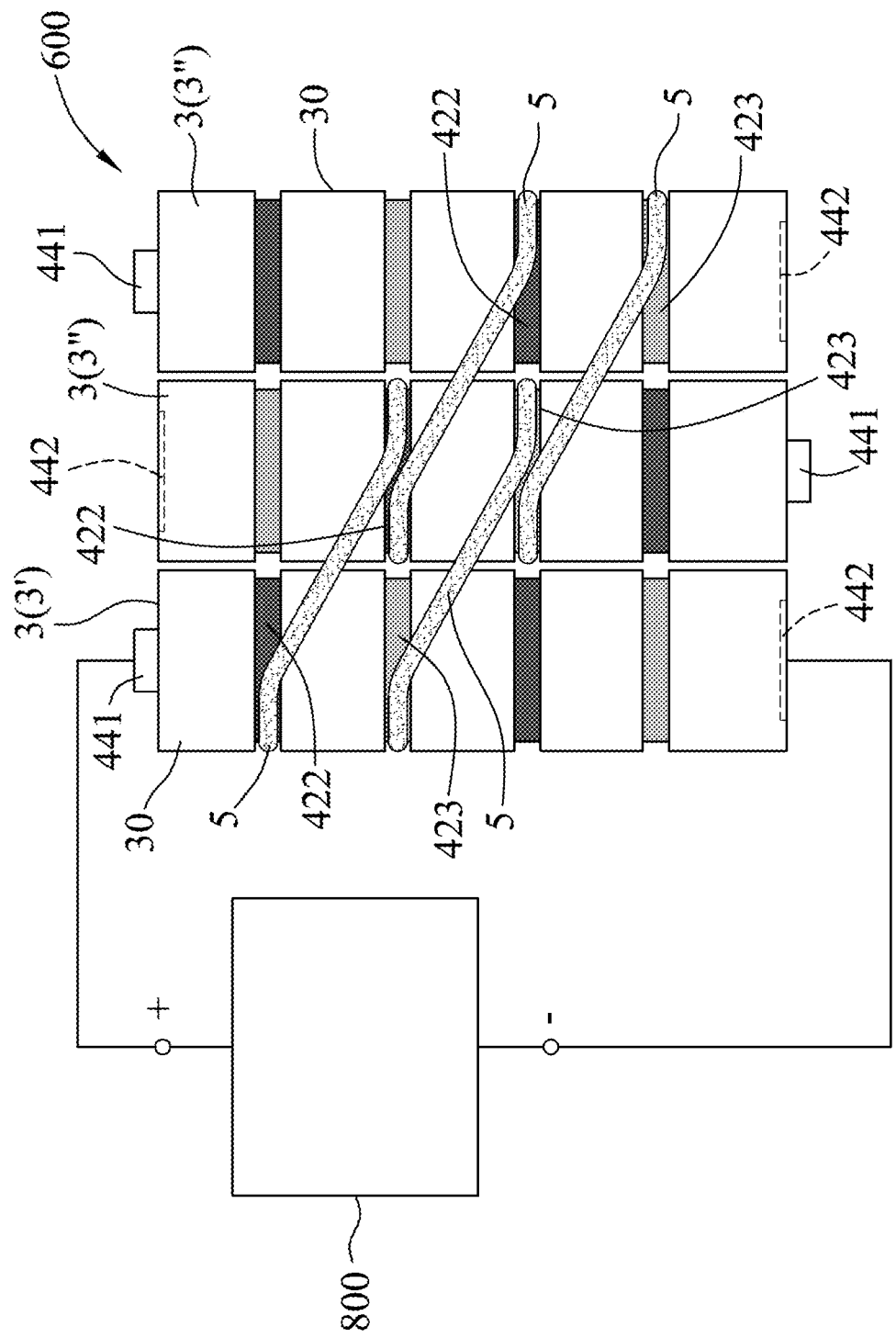
FIG. 4 is a side view of a second embodiment of the battery set according to the disclosure, which includes a plurality of the batteries that are each shown in FIG. 1 and that are arranged side by side.

Referring to FIGS. 2 and 4, a second embodiment of the battery set 600 according to the disclosure includes a number (P+1) of the aforesaid batteries 3 and a plurality of conductive elements 5, where P≥1. One of the batteries 3 serves as a main battery 3', and each of remaining ones of the batteries 3 serve as an auxiliary battery 3". For illustration purposes, P=2 in this embodiment.

Figure 5:
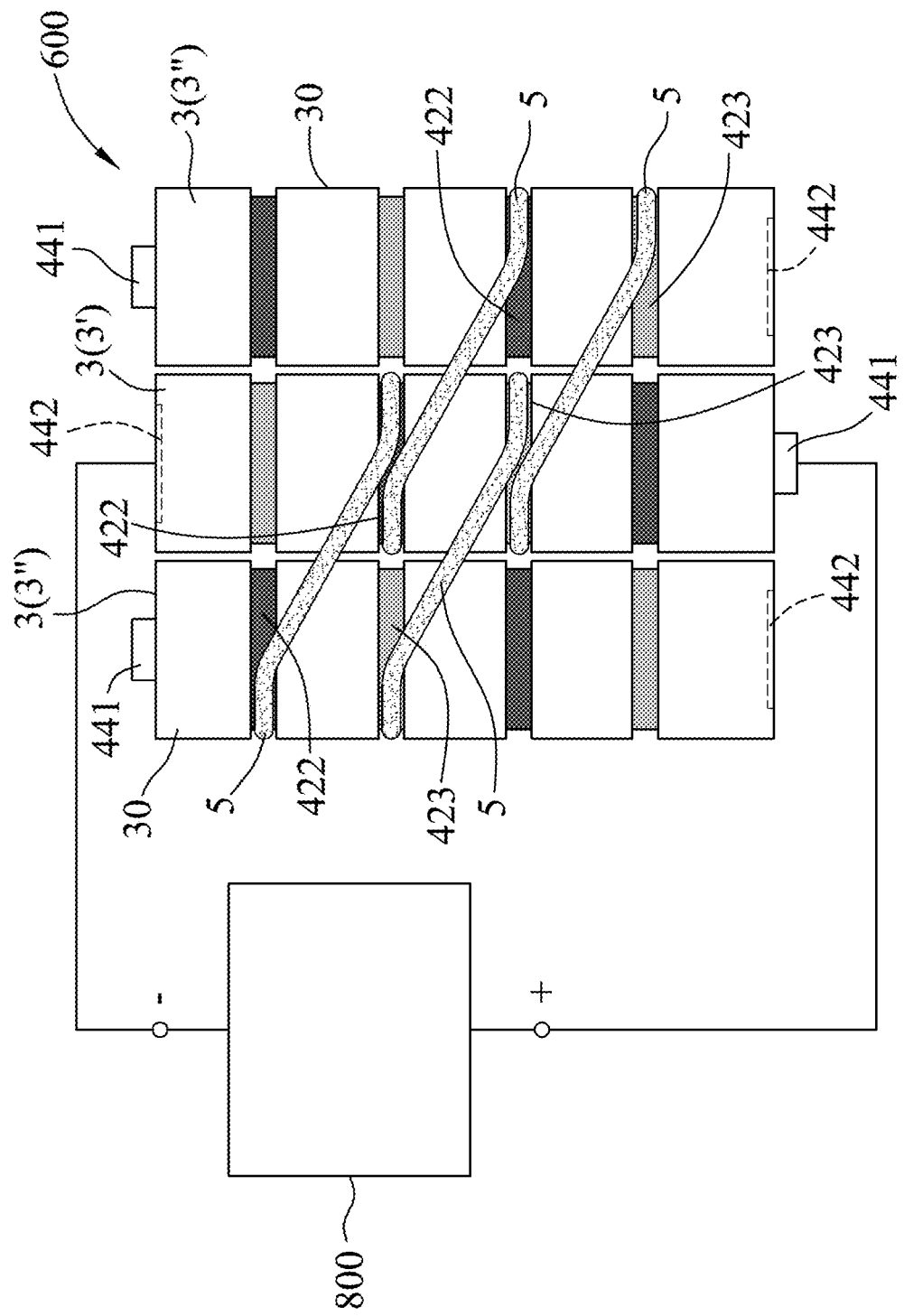
FIG. 5 is a side view of a modification of the second embodiment of the battery set according to the disclosure.

In this embodiment, the main and auxiliary batteries 3', 3" are arranged side by side. In other words, the main and auxiliary batteries 3', 3" are arranged along a direction perpendicular to the axis of the housing 30 of the main battery 3'. The auxiliary batteries 3" are disposed at a same side of the main battery 3' in this embodiment as shown in FIG. 4, but may be disposed at two opposite sides of the main battery 3' in a modification of this embodiment as shown in FIG. 5.

Through the conductive elements 5, the positive capacitor electrodes 422 of the main and auxiliary batteries 3', 3" are coupled to one another, and the negative capacitor electrodes 423 of the main and auxiliary batteries 3', 3" are coupled to one another, so the capacitor modules 42 of the main and auxiliary batteries 3', 3" are coupled in parallel.

The positive and negative output electrodes 441, 442 of the main battery 3' are adapted to be respectively coupled to the positive and negative terminals of the energy consuming device 800.

In operation, the energy management module 43 of the main battery 3' enters the active mode and selectively operates in one of the first to third states, and the energy management module 43 of each of the auxiliary batteries 3" enters the inactive mode.

It should be noted that, since the capacitor modules 42 of the main and auxiliary batteries 3', 3" are coupled in parallel, these capacitor modules 42 are charged simultaneously and are discharged simultaneously, and the total number of the auxiliary batteries 3" (i.e., the number (P)) can be adjusted to change electrical energy storage capacity of the battery set 600 of this embodiment.

It should be noted that a cover (not shown) can be used to cover and secure the main and auxiliary batteries 3', 3", with the positive and negative output electrodes 441, 442 of the main battery 3' exposed from the cover. The cover may be, for example, a soft film or a hard case.

Figure 6:
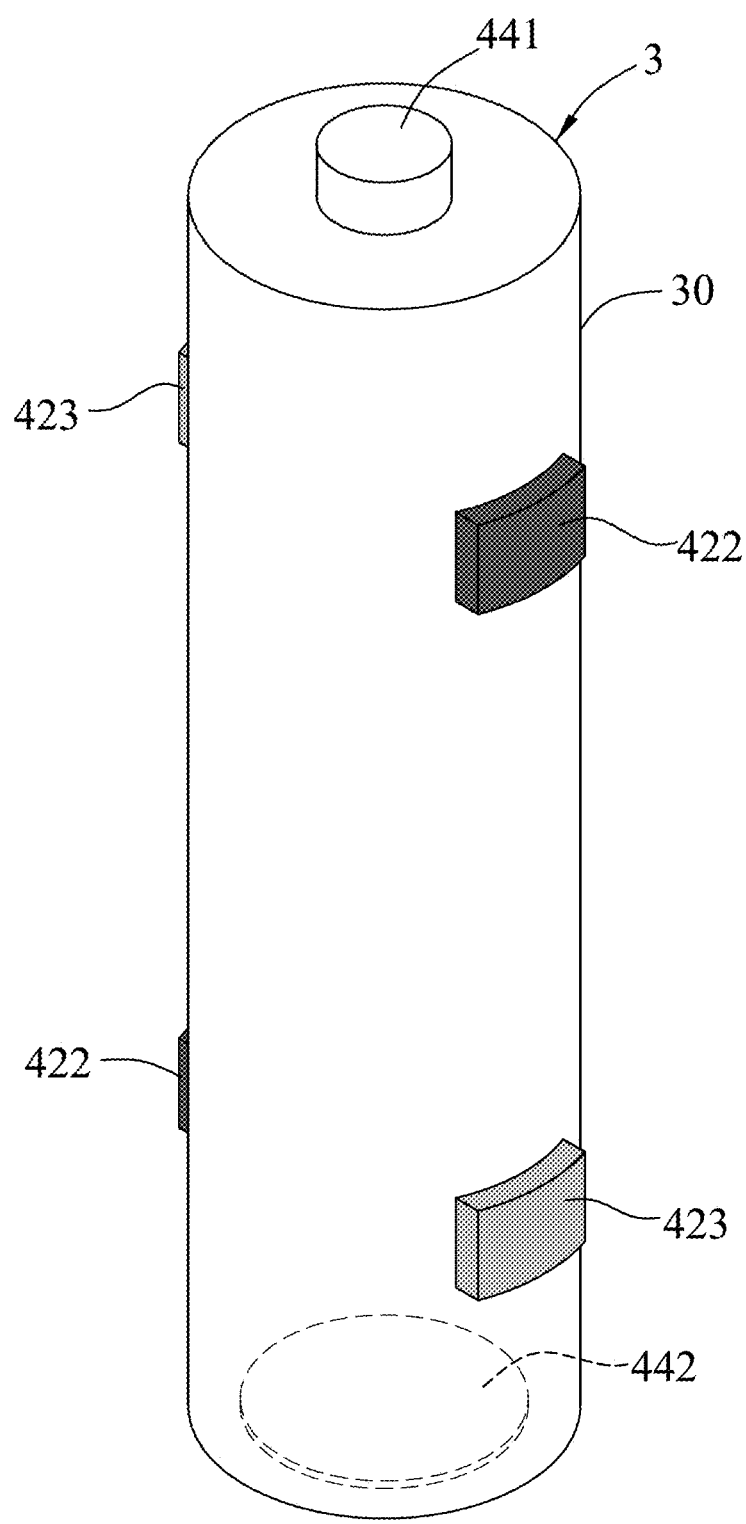
FIG. 6 is a perspective view of a modification of the embodiment of the battery according to the disclosure.

Referring to FIG. 6, in a modification of the aforesaid battery 3 (hereinafter referred to as the modified battery 3), each of the positive and negative capacitor electrodes 422, 423 are bump shaped, and is exposed and protrudes from the peripheral surface of the housing 30. In addition, the positive and negative capacitor electrodes 422, 423 are positioned in such a way that, when an additional one of the modified battery is disposed at a side of the modified battery 3, one of the positive capacitor electrodes 422 of the modified battery 3 can contact one of the positive capacitor electrodes 422 of the additional one of the modified battery, and one of the negative capacitor electrodes 423 of the modified battery 3 can contact one of the negative capacitor electrodes 423 of the additional one of the modified battery.

Figure 7:
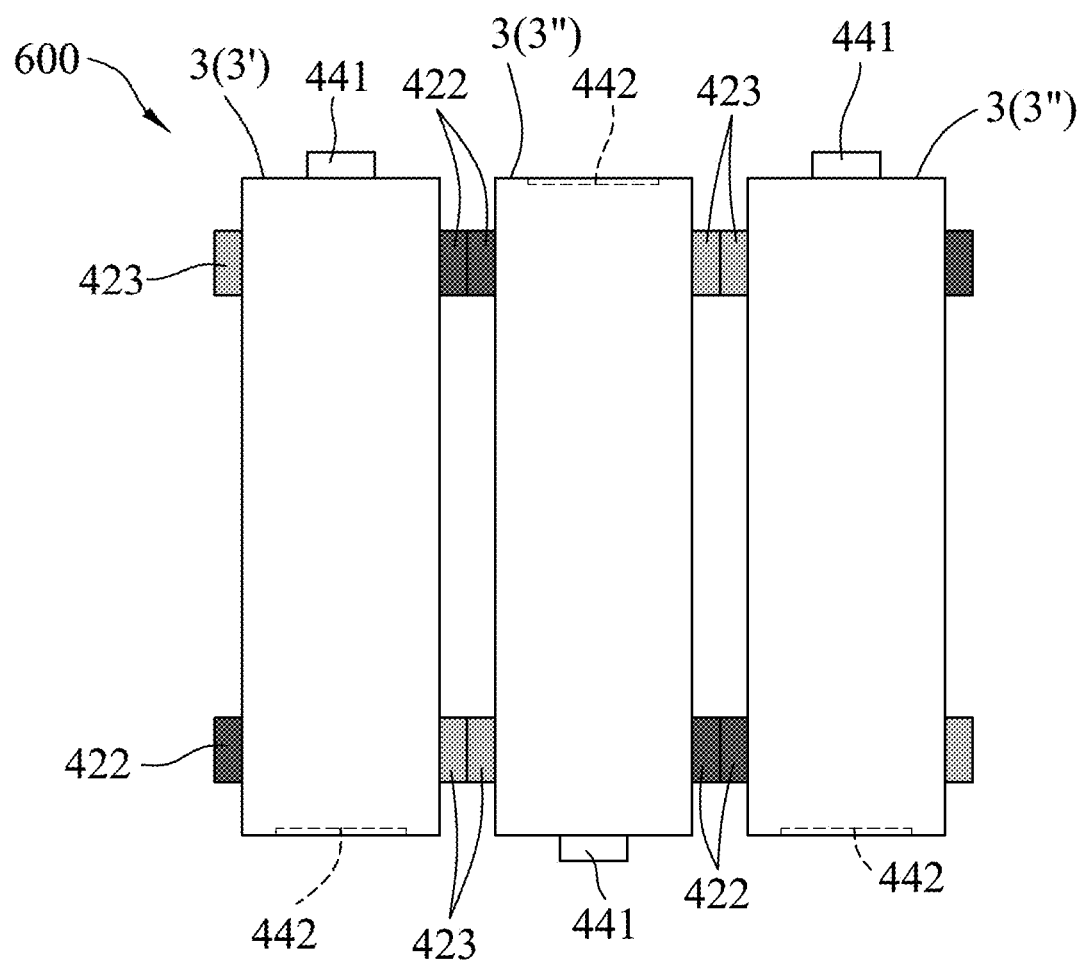
FIG. 7 is a side view of a third embodiment of the battery set according to the disclosure, which includes a plurality of the batteries that are each shown in FIG. 6 and that are arranged side by side.

Referring to FIG. 7, in a modification of the battery set 600 of the second embodiment (hereinafter referred to as the modified battery set 600), the conductive elements 5 (see FIG. 4) are omitted. In addition, each of the main and auxiliary batteries 3', 3" is the aforesaid modified battery 3. One of the positive capacitor electrodes 422 of a first one of the auxiliary batteries 3" contacts one of the positive capacitor electrodes 422 of the main battery 3', one of the negative capacitor electrodes 423 of the first one of the auxiliary batteries 3" contacts one of the negative capacitor electrodes 423 of the main battery 3', one of the positive capacitor electrodes 422 of a $p^{th}$ one of the auxiliary batteries 3" contacts another one of the positive capacitor electrodes 422 of a $(p-1)^{th}$ one of the auxiliary batteries 3", and one of the negative capacitor electrodes 423 of the $p^{th}$ one of the auxiliary batteries 3" contacts another one of the negative capacitor electrodes 423 of the $(p-1)^{th}$ one of the auxiliary batteries 3", where $2 \le p \le P$, so the capacitor modules 42 (see FIG. 2) of the main and auxiliary batteries 3', 3" are coupled in parallel.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that the disclosure is not limited to the disclosed embodiments but is intended to cover various arrangements included within the spirit and scope of the broadest interpretation so as to encompass all such modifications and equivalent arrangements.

What is claimed is:

1. A battery comprising a housing, and a wireless energy extracting device installed in said housing, said wireless energy extracting device including:

a radio frequency (RF) generator module for wirelessly receiving an RF charging signal to generate electrical energy;

a capacitor module including a capacitor electrode unit that is exposed from said housing, and that is adapted to be coupled to a capacitor electrode unit of an additional one of said battery such that said capacitor module is coupled to a capacitor module of the additional one of said battery in parallel; and an energy management module coupled to said RF generator module and said capacitor module, including an output electrode unit that is exposed from said housing and that is adapted to be coupled to an energy consuming device, and performing electrical energy transfer among said RF generator module, said capacitor module and the energy consuming device;

when said energy management module determines that output power of said RF generator module is greater than or equal to power required by the energy consuming device, said energy management module operating in a first state where electrical energy transfer from said RF generator module to at least the energy consuming device is performed;

when said energy management module determines that the output power of said RF generator module is smaller than the power required by the energy consuming device, said energy management module operating in a second state where electrical energy transfer from said RF generator module and said capacitor module to the energy consuming device is performed.

2. The battery of claim 1, wherein said energy management module further includes:

a capacitor control unit coupled to said capacitor module, detecting a residual electric quantity of said capacitor module, and operable to cause said capacitor module to perform one of storing electrical energy and releasing electrical energy stored therein; and a transfer control unit coupled to said RF generator module, said capacitor control unit and said output electrode unit, performing electrical energy transfer among said RF generator module, said capacitor control unit and the energy consuming device, and controlling operation of said capacitor control unit;

said transfer control unit cooperating with said capacitor control unit to perform the electrical energy transfer of any of the first and second states;

the electrical energy transfer of the second state being performed when said transfer control unit determines that the output power of said RF generator module is smaller than the power required by the energy consuming device while the detected residual electric quantity of said capacitor module is greater than or equal to a lower limit value.

3. The battery of claim 2, wherein:

said output electrode unit includes a positive output electrode that is coupled to said transfer control unit and that is adapted to be coupled further to the energy consuming device, and a negative output electrode that is adapted to be coupled to the energy consuming device;

said energy management module further includes a load detection unit coupled to said positive and negative output electrodes, to said capacitor control unit and to said transfer control unit;

when said load detection unit detects that there is a load to receive electrical energy, said energy management module enters an active mode where said transfer control unit cooperates with said capacitor control unit to perform the electrical energy transfer of any of the first and second states;

when said load detection unit detects that there is no load to receive electrical energy, said energy management module enters an inactive mode where said transfer control unit cooperates with said capacitor control unit to perform electrical energy transfer from said RF generator module to said capacitor module.

4. The battery of claim 3, wherein said energy management module further includes a protection unit that is coupled between said negative output electrode and said transfer control unit, that allows current flow from said negative output electrode to said transfer control unit therethrough, and that prevents current flow from said transfer control unit to said negative output electrode therethrough.

5. The battery of claim 3, wherein, in the first state, electrical energy transfer from said RF generator module to the energy consuming device and said capacitor module is performed when said transfer control unit determines that the output power of said RF generator module is greater than the power required by the energy consuming device while the detected residual electric quantity of said capacitor module is smaller than a saturation threshold, and electrical energy transfer from said RF generator module to the energy consuming device is performed otherwise.

6. The battery of claim 3, wherein:

said housing is rod shaped;

said capacitor electrode unit includes a number (M) of positive capacitor electrodes and a number (N) of negative capacitor electrodes, which are arranged at intervals along an axis of said housing, and which are exposed from a peripheral surface of said housing, where M≥1 and N≥1;

said positive and negative output electrodes are respectively exposed from two opposite end surfaces of said housing.

7. The battery of claim 6, wherein each of said positive and negative capacitor electrodes is ring shaped, and has an outer surface exposed from said peripheral surface of said housing.

8. The battery of claim 6, wherein M≥2 and N≥2.

9. A battery set comprising a main battery and a number (P) of auxiliary batteries, where P≥1;

said main battery including a first housing, and a first wireless energy extracting device installed in said first housing, said first wireless energy extracting device including a first radio frequency (RF) generator module for wirelessly receiving an RF charging signal to generate electrical energy, a first capacitor module including a first capacitor electrode unit exposed from said first housing, and a first energy management module coupled to said first RF generator module and said first capacitor module, including a first output electrode unit that is exposed from said first housing and that is adapted to be coupled to an energy consuming device, and performing electrical energy transfer among said first RF generator module, said first capacitor module and the energy consuming device, when said first energy management module determines that output power of said first RF generator module is greater than or equal to power required by the energy consuming device, said first energy management module operating in a first state where electrical energy transfer from said first RF generator module to at least the energy consuming device is performed, when said first energy management module determines that the output power of said first RF generator module is smaller than the power required by the energy consuming device, said first energy management module operating in a second state where electrical energy transfer from said first RF generator module and said first capacitor module to the energy consuming device is performed;

each of said auxiliary batteries including a second housing, and a second wireless energy extracting device installed in said second housing, said second wireless energy extracting device including a second RF generator module for wirelessly receiving the RF charging signal to generate electrical energy, a second capacitor module including a second capacitor electrode unit that is exposed from said second housing, and that is coupled to said first capacitor electrode unit such that said second capacitor module is coupled to said first capacitor module in parallel, and a second energy management module coupled to said second RF generator module and said second capacitor module, and performing electrical energy transfer from said second RF generator module to said second capacitor module.

10. The battery set of claim 9, wherein said main battery and said auxiliary batteries are arranged side by side.

11. The battery set of claim 10, wherein P=2, and said auxiliary batteries are respectively disposed at two opposite sides of said main battery.

12. The battery set of claim 10, wherein P=2, and said auxiliary batteries are disposed at a same side of said main battery.

13. The battery set of claim 9, wherein said main battery and said auxiliary batteries are arranged tandem.

14. The battery set of claim 9, further comprising a plurality of conductive elements, wherein:

said first capacitor electrode unit includes a first positive capacitor electrode and a first negative capacitor electrode;

said second capacitor electrode unit of each of said auxiliary batteries includes a second positive capacitor electrode and a second negative capacitor electrode;

through said conductive elements, said first and second positive capacitor electrodes of said main and auxiliary batteries are coupled to one another, and said first and second negative capacitor electrodes of said main and auxiliary batteries are coupled to one another.

15. The battery set of claim 9, wherein said first energy management module further includes:

a first capacitor control unit coupled to said first capacitor module, detecting a residual electric quantity of said first capacitor module, and operable to cause said first capacitor module to perform one of storing electrical energy and releasing electrical energy stored therein; and a first transfer control unit coupled to said first RF generator module, said first capacitor control unit and said first output electrode unit, performing electrical energy transfer among said first RF generator module, said first capacitor control unit and the energy consuming device, and controlling operation of said first capacitor control unit;

said first transfer control unit cooperating with said first capacitor control unit to perform the electrical energy transfer of any of the first and second states;

the electrical energy transfer of the second state being performed when said first transfer control unit determines that the output power of said first RF generator module is smaller than the power required by the energy consuming device while the detected residual electric quantity of said first capacitor module is greater than or equal to a lower limit value.

16. The battery set of claim 15, wherein:

in the first state, electrical energy transfer from said first RF generator module to the energy consuming device and said first capacitor module is performed when said first transfer control unit determines that the output power of said first RF generator module is greater than the power required by the energy consuming device while the detected residual electric quantity of said first capacitor module is smaller than a saturation threshold, and electrical energy transfer from said first RF generator module to the energy consuming device is performed otherwise;

for each of said auxiliary batteries, said second energy management module detects a residual electric quantity of said second capacitor module, and performs the electrical energy transfer from said second RF generator module to said second capacitor module when said second energy management module determines that the detected residual electric quantity of said second capacitor module is smaller than the saturation threshold.

17. The battery set of claim 15, wherein:

P=1;

said first output electrode unit includes a first positive output electrode that is coupled to said first transfer control unit and that is adapted to be coupled further to the energy consuming device, and a first negative output electrode that is grounded;

said second energy management module includes a second output electrode unit;

said second output electrode unit includes a second positive output electrode that is coupled to said first negative output electrode, and a second negative output electrode that is grounded and that is adapted to be coupled to the energy consuming device.

18. The battery set of claim 17, wherein said first energy management module further includes a protection unit that is coupled between said first negative output electrode and said first transfer control unit, that allows current flow from said first negative output electrode to said first transfer control unit, and that prevents current flow from said first transfer control unit to said first negative output electrode.

19. The battery set of claim 15, wherein:

P≥2;

said first output electrode unit includes a first positive output electrode that is coupled to said first transfer control unit and that is adapted to be coupled further to the energy consuming device, and a first negative output electrode that is grounded;

for each of said auxiliary batteries, said second energy management module includes a second output electrode unit, and said second output electrode unit includes a second positive output electrode, and a second negative output electrode that is grounded;

said second positive output electrode of a first one of said auxiliary batteries is coupled to said first negative output electrode;

said second positive output electrode of a $p^{th}$ one of said auxiliary batteries is coupled to said second negative output electrode of a $(p-1)^{th}$ one of said auxiliary batteries, where 2≤p≤P;

said second negative output electrode of a $P^{th}$ one of said auxiliary batteries is adapted to be coupled to the energy consuming device.

* * * * *